UNITED STATES PATENT OFFICE.

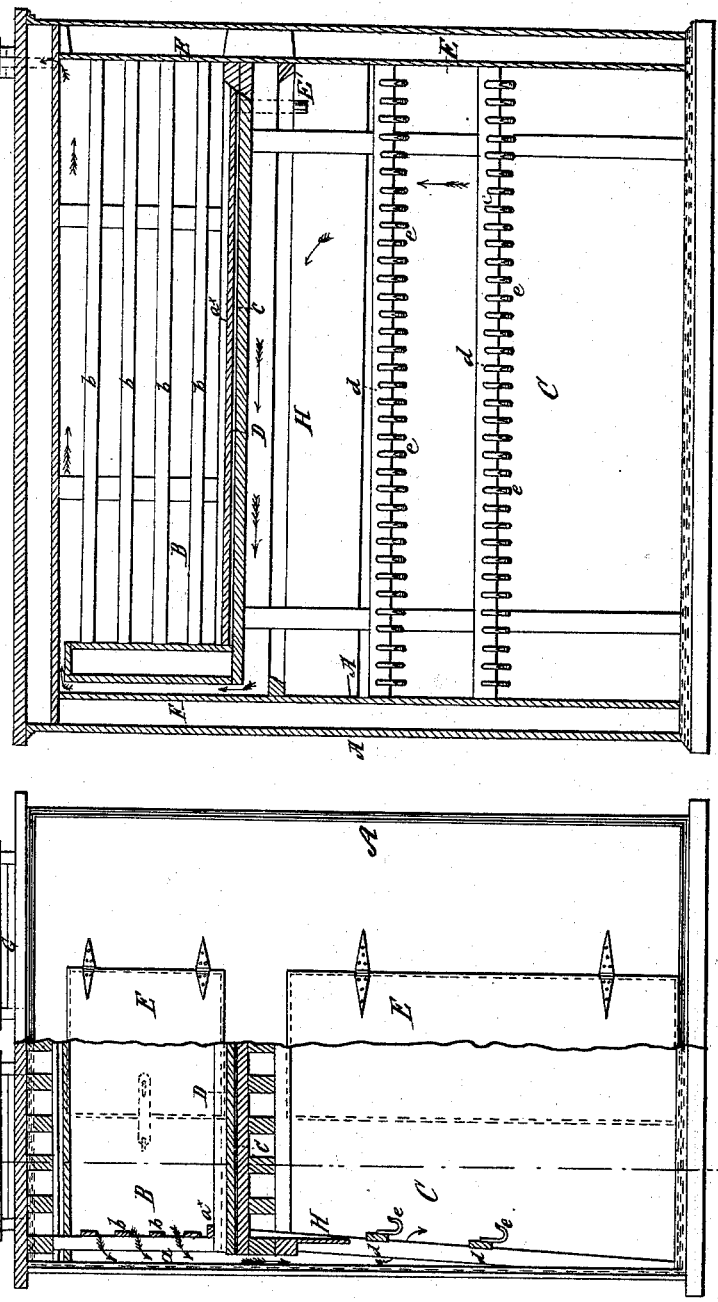

J. HYDE FISHER, OF CHICAGO, ILLINOIS.

REFRIGERATOR OR HOUSE FOR PRESERVING ANIMAL AND VEGETABLE SUBSTANCES.

Specification forming part of Letters Patent No. 49,098, dated August 1, 1865.

*To all whom it may concern:*

Be it known that I, J. HYDE FISHER, of Chicago, in the county of Cook and State of Illinois, have invented a new and Improved House for Preserving Animal and Vegetable Substances; and I do hereby declare that the following is a full, clear, and exact description thereof, which will enable others skilled in the art to make and use the same, reference being had to the accompanying drawings, forming part of this specification, in which—

Figure 1 is an end elevation of my invention, partly in section; Fig. 2, a longitudinal vertical section of the same, taken in the line $x\,x$, Fig. 1.

Similar letters of reference indicate corresponding parts.

This invention relates to a new and improved house for preserving animal and vegetable substances, and is applicable for use on a large scale—for instance, in packing-houses, breweries, hotels, steamboats, &c.—as well as on a small scale for family use.

The invention consists in constructing the ice and vegetable and meat chambers and forming a communication between them in such a manner that the warm air from the meat and vegetable chamber will not come in contact with the cold air which descends from the ice-chamber, but will be carried off through a suitable flue, with all vapor and gases, thereby keeping the meat and vegetable chamber at a low temperature and in a dry state.

The walls A of the house are constructed double and filled in between with any good non-conductor of heat, such as tan-bark, rice-chaff, charcoal, &c.

The house is divided into two compartments, B C, by a flooring, D, slightly inclined, as shown in Fig. 2, said flooring inclining downward from the rear toward the front of the house, where the doors E E are inserted. The upper compartment, B, is the ice-chamber, and it is made to communicate with the lower compartment, C, by spaces $a$ at each side of the flooring D and at the outer sides of slats or bars $b$, which serve as guards to prevent the ice coming in contact with the walls A and obstructing the communication between the two compartments. (See Fig. 1.) The flooring D has a filling or lining of pitch, gutta-percha, or other waterproof substance, $c$, to prevent the waste-water from the ice passing through it, and this water, owing to the inclination of the flooring, is carried off through a spout, E′, the flooring being provided with side strips, $a^x$, to prevent the water from passing over into the spaces $a\,a$.

At the rear of the ice-chamber B there is a vertical flue, F, which extends the whole width of said chamber, and projects upward within a short distance of the ceiling or top of the house. The lower end of this flue communicates with the compartment C, as shown clearly in Fig. 2.

In the top of the house, at its front end, there are ventilators, G and at each side of the lower chamber, C, there is an apron, H. These aprons extend the whole length of said chamber and extend down from the spaces $a\,a$, as shown in Fig. 1, so as to prevent the warm air from chamber C passing up into said spaces and being condensed. The chamber C has bars $d$ at each side of it, into which hooks $e$ are driven to hang articles upon.

The only possibility of warm air entering chamber C is when its door E is opened. This air ascends directly upward against the flooring D and passes to the rear of the same, up flue F, and over the top of the ice in B to the ventilator G, through which it escapes. (See black arrow.)

The cold air from compartment B passes down through the spaces $a\,a$ into chamber C, as indicated by the red arrows in Fig. 1.

This invention has been practically tested, and it operates well. The aprons H are an important feature of the invention, as they effectually prevent the condensing of the warm moist air, which would otherwise occur in the spaces $a\,a$, and cause said air, with the vapor and gases, to pass up into the flue F.

The articles to be preserved are placed in the lower chamber, C, either hung on hooks $e$ or suspended or arranged in any other suitable manner.

Having thus described my invention, I claim as new and desire to secure by Letters Patent—

1. The spaces $a\,a$ at the sides of the flooring D, between the upper and lower compartments, B C, of the house, in combination with the aprons H H, flue F, and ventilator G, all arranged substantially as and for the purpose set forth.

2. The inclined water-proof flooring D, provided with side strips, $a^x$, and a spout, E, for the purpose specified.

J. HYDE FISHER.

Witnesses:
JOHN E. WOODMAN,
JAMES A. CLYBOURN, Jr.